US011702525B2

(12) United States Patent
Mann

(10) Patent No.: US 11,702,525 B2
(45) Date of Patent: Jul. 18, 2023

(54) CATIONOMERIC POLYOLEFIN COMPOSITIONS AND METHODS FOR PRODUCTION AND USE THEREOF

(71) Applicant: ExxonMobil Chemical Patents Inc., Baytown, TX (US)

(72) Inventor: Jason A. Mann, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 714 days.

(21) Appl. No.: 16/692,698

(22) Filed: Nov. 22, 2019

(65) Prior Publication Data

US 2020/0172691 A1 Jun. 4, 2020

Related U.S. Application Data

(60) Provisional application No. 62/775,155, filed on Dec. 4, 2018.

(51) Int. Cl.
*C08J 9/04* (2006.01)
*C08F 8/30* (2006.01)
(Continued)

(52) U.S. Cl.
CPC ............. *C08J 9/04* (2013.01); *C08F 8/30* (2013.01); *C08F 8/42* (2013.01); *C08F 210/10* (2013.01);
(Continued)

(58) Field of Classification Search
CPC ...... C08J 9/04; C08J 9/286; C08J 2201/0543; C08J 2323/22; C08J 2325/08;
(Continued)

(56) References Cited

U.S. PATENT DOCUMENTS

| 4,074,035 A | 2/1978 | Powers et al. ............... 526/185 |
| 5,162,445 A | 11/1992 | Powers et al. ............. 525/333.4 |

(Continued)

FOREIGN PATENT DOCUMENTS

| CN | 107200938 | 9/2017 | ............. C08L 23/22 |
| WO | 1994/010214 | 5/1994 | ............... C08F 8/40 |

(Continued)

OTHER PUBLICATIONS

G. Tillet; B. Boutevin; B. Ameduri. Chemical reactions of polymer crosslinking and post-crosslinking at room and medium temperature. Progress in Polymer Science 36 (2011) 191-217. (Year: 2011).*

(Continued)

*Primary Examiner* — Michael M Dollinger
*Assistant Examiner* — Christina H. W. Rosebach

(57) ABSTRACT

Although polyolefin elastomers are widely employed commodity polymers, there are shortcomings of this class of polymers for certain applications. For example, the rheological properties of some polyolefin elastomers may be insufficient to provide the green strength or low shear viscosity necessary to form stable foams, or to provide sufficient viscosity modification effects when present in a solvent. Cationomeric modification of polyolefin elastomers may alleviate these difficulties. Such polyolefin elastomers may feature a random cationomeric polyolefin copolymer comprising at least a first monomer and a second monomer, in which the first monomer is a neutral monomer and the second monomer has a side chain bearing a cationic moiety. The polyolefin elastomers may be present in foamed polyolefin compositions comprising a gas component and/or in liquid compositions comprising a solvent in which the polyolefin elastomer is dissolved.

4 Claims, 3 Drawing Sheets

(51) Int. Cl.

| | | |
|---|---|---|
| *C08F 210/18* | (2006.01) | |
| *C08F 212/14* | (2006.01) | |
| *C08F 212/08* | (2006.01) | |
| *C08F 210/10* | (2006.01) | |
| *C08J 9/28* | (2006.01) | |
| *C08F 8/42* | (2006.01) | |

(52) U.S. Cl.
CPC .......... *C08F 212/08* (2013.01); *C08F 212/21* (2020.02); *C08J 9/286* (2013.01); *C08F 210/18* (2013.01); *C08J 2201/0543* (2013.01); *C08J 2323/22* (2013.01); *C08J 2325/08* (2013.01); *C08J 2325/18* (2013.01)

(58) Field of Classification Search
CPC .. C08J 2325/18; C08J 2300/10; C08F 212/21; C08F 212/08; C08F 8/30; C08F 8/42; C08F 210/10; C08F 210/02; C08F 210/06; C08F 210/18; C08F 8/48
See application file for complete search history.

(56) References Cited

U.S. PATENT DOCUMENTS

| | | | | |
|---|---|---|---|---|
| 6,060,563 | A | 5/2000 | Peiffer et al. | 525/213 |
| 7,135,529 | B2 | 11/2006 | Sullivan | 525/294 |
| 9,695,353 | B2 | 7/2017 | Nelson et al. | C09K 8/703 |
| 2003/0204022 | A1 | 10/2003 | Kennedy et al. | 525/242 |
| 2017/0233563 | A1* | 8/2017 | Adkinson | C08L 23/06 524/514 |
| 2019/0085146 | A1* | 3/2019 | Chino | C08L 101/02 |

FOREIGN PATENT DOCUMENTS

| | | | | |
|---|---|---|---|---|
| WO | 2007/055793 | 5/2007 | ............... | C08K 9/04 |
| WO | 2011/089083 | 7/2011 | ............... | C08F 8/32 |
| WO | 2013/147989 | 10/2013 | ............... | C08F 8/32 |
| WO | WO-2017159786 A1 * | 9/2017 | ............... | C08F 8/30 |

OTHER PUBLICATIONS

K.C. Khemani. Polymeric Foams: An Overview. In Polymeric Foams. ACS Symposium Series; American Chemical Society: Washington, DC, 1997. (Year: 1997).*

Gilbert, Marianne. (2017). Brydson's Plastics Materials (8th Edition)—4.5 Transition Temperatures in Copolymers. Elsevier. Retrieved from https://app.knovel.com/hotlink/pdf/id:kt0114LHM1/brydsons-plastics-materials/transition-temperatures (Year: 2017).*

Bacon, S L. et al. (2016) "Isobutylene-Rich Imidazolium Ionomers for use in Two-Phase Partitioning Bioreactors," *Green Chemistry*, v.18(24), pp. 6586-6595.

Livi, S. et al. (2013) "Supercritical CO2-Ionic Liquida: Green Combination for Preparing Foams," *Chem. Eng. Jrnl.*, v.240, pp. 534-540.

Parent, S. et al. (2004) "Synthesis and Characterization of Isobutylene-Based Ammonium and Phosphonium Bromide Ionomers," *Macromolecules*, v.37, pp. 7477-7483.

Talukdar, B. et al. (2012) "An Imidazolium-Functionalized Isobutylene Polymer Having Improved Mechanical and Barrier Properties: Synthesis and Characterization," *Jrnl. Applied Polymer Sci.*, v.128(5), pp. 2911-2918.

Tomasko, D. L. et al. (2003) "A Review of CO2 Applications in the Processing of Polymers," *Industrial & Engineering Chem. Res.*, v.42(25), pp. 6431-6456.

Tsou, A. H. et al. (2004) "Quaternary Ammonium Elastomeric Ionomers by Melt-State Conversion," *Polymer*, v.45(10), pp. 3163-3173.

* cited by examiner

CATIONOMERIC POLYOLEFIN COMPOSITIONS AND METHODS FOR PRODUCTION AND USE THEREOF

CROSS-REFERENCE TO RELATED APPLICATIONS

This application claims priority to and the benefit of U.S. Ser. No. 62/775,155, filed Dec. 4, 2018.

FIELD

The present disclosure relates to polyolefins having cationomeric side chain modification.

BACKGROUND

Polyolefin elastomers are commodity polymeric materials that are increasingly being employed in applications where natural and synthetic rubber materials and other synthetic elastomers have been more traditionally used. Depending on the nature of the intended application and the particular polyolefin backbone, polyolefin elastomers may be cross-linked (vulcanized) or non-crosslinked. When crosslinked, various crosslinking strategies may be employed.

Despite their favorability, polyolefin elastomers often lack sufficient green strength or low shear viscosity values needed for functionality in certain applications. For example, poor rheological properties may limit the ability of some polyolefin elastomers to form a stable foam. In addition, the rheological properties of many polyolefin elastomers may be insufficient to promote a desired extent of viscosity modification when the polyolefin elastomer is dissolved in a solvent. Fatigue and abrasion resistance in dynamic applications may also be problematic with conventional polyolefin elastomers.

The rheological properties of unmodified polyolefin elastomers may influenced by mechanical relaxation along the polyolefin polymer backbone. A second relaxation mode may be introduced to polyolefin elastomers to improve their performance. Namely, long chain alkyl branching (i.e., side chains) may be introduced to the polyolefin polymer backbone in order to improve the rheological properties. The long chain alkyl branching (e.g., $C_{6+}$ alkyl groups) is typically present upon only a minor portion of the olefinic monomers within such polyolefin elastomers. With long chain alkyl branching in place, the polyolefin elastomers are more properly considered to constitute a copolymer comprising both unbranched and branched olefinic monomers.

Long chain alkyl branching is typically introduced to polyolefin elastomers by copolymerizing two different olefinic monomers, one of which contains a substituted olefin having the long chain alkyl group. Since the two olefinic monomers may react at different rates during a polymerization reaction, it can sometimes be difficult to control the amount of long chain alkyl branching that is present along the polyolefin polymer backbone. In addition, there are few options for varying the side chain structure upon the polyolefin polymer backbone other than by choosing an entirely different set of olefinic monomers for polymerization. Given the non-convergent manner in which different side chains are introduced to polyolefin elastomers, it may take a considerable amount of time and effort to identify a particular copolymer having suitable properties for an intended application.

SUMMARY

In some embodiments, the present disclosure provides foamed polyolefin compositions comprising: a random cationomeric polyolefin copolymer comprising at least a first monomer and a second monomer, and a gas component disposed in a plurality of voids within the random cationomeric polyolefin copolymer. The first monomer is a neutral monomer and the second monomer has a side chain bearing a cationic moiety.

In some embodiments, the present disclosure provides liquid polyolefin compositions comprising: a random cationomeric polyolefin copolymer comprising at least a first monomer and a second monomer, and a solvent in which the random cationomeric polyolefin copolymer is dissolved. The first monomer is a neutral monomer and the second monomer has a side chain bearing a cationic moiety.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

Figure 1:
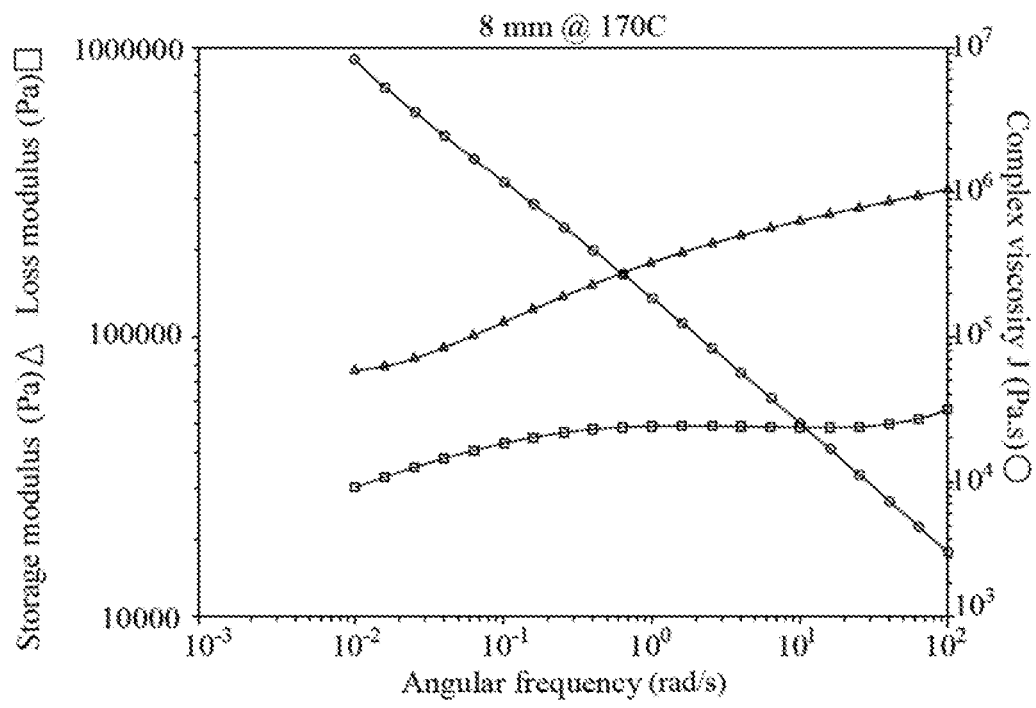
FIGS. 1-6 show graphs of illustrative rheological behavior of Polymers 1-6, each of which is a random cationomeric polyolefin copolymer.

The present disclosure generally relates to polyolefin elastomers and, more specifically, to polyolefin elastomers having a cationic moiety and methods for production and use thereof.

As discussed above, polyolefin elastomers may sometimes be used as a substitute for natural rubber and synthetic elastomeric polymers. However, polyolefin elastomers exhibit rheological properties or behavior that may preclude their use in certain instances. For example, polyolefin elastomers lacking long alkyl groups as a side chain may lack green strength and exhibit poor low shear viscosity values, which may prevent such polyolefin elastomers from being foamed and/or providing viscosity modification when disposed in a liquid phase. Although incorporating long chain alkyl groups in a polyolefin elastomer may at least partially address these issues, it may be difficult to incorporate the alkyl groups other than during the initial polymerization reaction. As a result, it may be difficult or impossible to control the extent of branching that does occur. These difficulties may result in product quality issues, such as gel formation in certain polyolefin elastomer compositions. Thus, it may be a laborious and time-consuming process to identify a suitable polyolefin elastomer for use in a particular application.

Polyolefin elastomers having ionomeric substitution in the polymer side chains may afford similar benefits to those having long chain alkyl groups. As used herein, the terms "ionomeric" and "ionomer" refer to the feature of having an ionically charged group in a polymer, particularly within a side chain. Ionomers may be positively charged (cationomeric) or negatively charged (anionomeric). Non-protonated cationomers may maintain their charge over all pH conditions. Although ionomeric groups may be present during a polymerization reaction, this approach leads to issues similar to those of introducing long chain alkyl groups. Namely, incorporation of the ionomeric groups is similarly non-convergent, and identification of a particular ionomeric polyolefin for a given application may be a laborious and time-consuming process. In addition, while ionomeric polyolefins may exhibit elevated low shear viscosity values that can facilitate their use in various applications, the elevated low shear viscosity values can lead to problematic processing during and/or following a polymerization reaction.

In contrast to the foregoing, the present disclosure provides a much more convergent approach for synthesizing ionomeric polyolefin copolymers. Namely, the present disclosure describes a post-polymerization functionalization approach, in which a nucleophile (nucleophilic component) reacts with a highly reactive leaving group in a side chain of the polyolefin to introduce a positively charged group (cationic moiety) therein. Alternately, the leaving group may be located upon the polymer backbone, and the positively charged group may be present within a newly introduced side chain. In either case, the ionomeric polyolefin copolymers disclosed herein are cationomeric. The highly reactive leaving groups in the polyolefin are benzylic or allylic halides, particularly benzylic or allylic chlorides or bromides, which may undergo ready displacement when exposed to a suitable nucleophile. The incoming nucleophile may be chosen such that a positively charged nitrogen atom or a positively charged phosphorus atom is located at the site of nucleophilic displacement. Alternately, a positively charged nitrogen atom or a positively charged phosphorus atom may be tethered to the site of nucleophilic displacement, in which case a non-protonated atom is present at the site of nucleophilic displacement. Other reaction strategies for introducing a cationic moiety to a previously synthesized polyolefin may also be feasible and are discussed further herein below.

The cationomeric polyolefin copolymers of the present disclosure and processes for formation thereof may afford a number of advantages. From a processing standpoint alone, post-polymerization incorporation of a cationomeric group may be particularly advantageous. Namely, introducing a cationomeric group to the polyolefin post-polymerization represents a much more convergent synthetic approach than pre-polymerization cationomer group introduction. In addition, introducing a cationomeric group at a post-polymerization stage can simplify processing compared to pre-polymerization cationomer introduction. Although both approaches may lead to elevated low shear viscosity values, the elevated low shear viscosity values may be more effectively managed at a stage following the polymerization reaction.

Advantageously, elevated low shear viscosity values may be addressed by the cationomeric polyolefin copolymers of the present disclosure in several ways. First, elevated low shear viscosity values may occur when the copolymer is undergoing finishing, which may result in the copolymer forming under high shear conditions and resting after introduction of the cationic moieties. Second, the use of a polymer solution during formation of the cationomeric polyolefin copolymers may also alleviate elevated low shear viscosity values. Finally, the cationomeric polyolefin copolymers may be plasticized with a wide range of plasticizers during processing.

In addition to processing advantages, introducing a cationomeric group to a side chain of a polyolefin elastomer may afford significant application advantages as well. The aforementioned enhanced low shear viscosity values may facilitate use of the cationomeric polyolefin copolymers in such applications. Namely, sufficiently enhanced low shear viscosity values may allow the cationomeric polyolefin copolymers to form stable foams. Foams may comprise the neat (solvent-free) cationomeric polyolefin copolymer or a foamed solution containing the cationomeric polyolefin copolymer. In addition, sufficiently enhanced low shear viscosity values may allow the cationomeric polyolefin copolymers to exhibit rheological properties sufficient to promote viscosity modification of a liquid. The foregoing features can facilitate use of the cationomeric polyolefin copolymers in applications where other polyolefin elastomers might not otherwise be feasible. Additional advantages of the cationomeric polyolefin copolymers disclosed herein include, for example, fatigue and abrasion resistance, and potential self-healing properties.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A", and "B."

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides).

As used herein, Mn is number average molecular weight, Mw is weight average molecular weight, and Mz is z average molecular weight. Suitable measurement techniques for each type of molecular weight measurement will be familiar to one having ordinary skill in the art. Molecular weight distribution (MWD), also referred to as the polydispersity index (PDI), is defined to be Mw divided by Mn. Unless otherwise noted, all molecular weights are expressed in g/mol.

The term "hydrocarbon" refers to a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "Cn" refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic.

The terms "saturated" or "saturated hydrocarbon" refer to a hydrocarbon or hydrocarbyl group in which all carbon atoms are bonded to four other atoms or are bonded to three other atoms with one unfilled valence position thereon.

The terms "unsaturated" or "unsaturated hydrocarbon" refer to a hydrocarbon or hydrocarbyl group in which one or more carbon atoms are bonded to less than four other atoms, optionally with one unfilled valence position on the one or more carbon atoms.

The terms "hydrocarbyl" and "hydrocarbyl group" are used interchangeably herein. The term "hydrocarbyl group" refers to any $C_1$-$C_{100}$ hydrocarbon group bearing at least one unfilled valence position when removed from a parent compound. "Hydrocarbyl groups" may be optionally substituted, in which the term "optionally substituted" refers to replacement of at least one hydrogen atom or at least one carbon atom with a heteroatom or heteroatom functional group. Heteroatoms may include, but are not limited to, B, O, N, S, P, F, Cl, Br, I, Si, Pb, Ge, Sn, As, Sb, Se, and Te.

Heteroatom functional groups that may be present in substituted hydrocarbyl groups include, but are not limited to, functional groups such as O, S, S=O, S(=O)$_2$, NO$_2$, F, Cl, Br, I, NR$_2$, OR, SeR, TeR, PR$_2$, AsR$_2$, SbR$_2$, SR, BR$_2$, SiR$_3$, GeR$_3$, SnR$_3$, PbR$_3$, where R is a hydrocarbyl group or H. Suitable hydrocarbyl groups may include alkyl, alkenyl, alkynyl, aryl, aralkyl, heteroaryl, cycloalkyl, heterocyclyl, and the like, any of which may be optionally substituted.

The term "alkyl" refers to a hydrocarbyl group having no unsaturated carbon-carbon bonds, and which may be optionally substituted. The term "alkylene" refers to an alkyl group having at least two open valence positions.

The term "alkenyl" refers to a hydrocarbyl group having a carbon-carbon double bond, and which may be optionally substituted. The terms "alkene" and "olefin" are used synonymously herein. Similarly, the terms "alkenic" and "olefinic" are used synonymously herein. Unless otherwise noted, all possible geometric isomers are encompassed by these terms. The term "diene" refers to an alkenyl group having two carbon-carbon double bonds.

The terms "aromatic" and "aromatic hydrocarbon" refer to a hydrocarbon or hydrocarbyl group having a cyclic arrangement of conjugated pi-electrons that satisfy the Hückel rule. The term "aryl" is equivalent to the term "aromatic" as defined herein. The term "aryl" refers to both aromatic compounds and heteroaromatic compounds, either of which may be optionally substituted. Both mononuclear and polynuclear aromatic and heteroaromatic compounds are encompassed by these terms. The term "arylene" refers to an aryl group having at least two open valence positions.

Examples of saturated hydrocarbyl groups include, but are not limited to, methyl, ethyl, n-propyl, isopropyl, n-butyl, isobutyl, sec-butyl, tert-butyl, pentyl, isopentyl, hexyl, octyl, cyclopropyl, cyclobutyl, cyclopentyl, cyclohexyl, cyclooctyl, and the like, including their substituted analogues. Examples of unsaturated hydrocarbyl groups include, but are not limited to, ethenyl, propenyl, allyl, butadienyl, cyclopropenyl, cyclobutenyl, cyclopentenyl, cyclohexenyl, cyclooctenyl and the like, including their substituted analogues.

Examples of aromatic hydrocarbyl groups include, but are not limited to, phenyl, tolyl, xylyl, naphthyl, and the like, including all possible isomeric forms thereof. Heteroaryl and polynuclear heteroaryl groups may include, but are not limited to, pyridine, quinoline, isoquinoline, pyrimidine, quinazoline, acridine, pyrazine, quinoxaline, imidazole, benzimidazole, pyrazole, benzopyrazole, oxazole, benzoxazole, isoxazole, benzisoxazole, imidazoline, thiophene, benzothiophene, furan and benzofuran. Polynuclear aryl hydrocarbyl groups may include, but are not limited to, naphthalene, anthracene, indane, indene, and tetralin.

The term "linear" refers to a hydrocarbon or hydrocarbyl group having a continuous carbon chain without side chain branching, in which the continuous carbon chain may be optionally substituted with heteroatoms or heteroatom groups.

The term "alpha olefin" refers to an alkenic hydrocarbon bearing a carbon-carbon double bond at a terminal (end) carbon atom of the main carbon chain.

The terms "branch" and "branched" refer to a hydrocarbon or hydrocarbyl group having a linear main carbon chain or cyclic carbon ring in which a hydrocarbyl side chain extends from the linear main carbon chain or cyclic carbon ring. Optional heteroatom substitution may be present in the linear main carbon chain, the cyclic carbon ring, or in the hydrocarbyl side chain.

The term "homopolymer" refers to a polymer in which all monomers are the same. The term "copolymer" refers to a polymer in which two or more different monomers are present. The term "terpolymer" refers to a polymer in which three different monomers are present. The term "different" indicates that the monomers differ from one another by the presence or absence of at least one atom and/or isomerically.

The term "benzylic" refers to a sp$^3$ carbon atom directly bonded to an aromatic or heteroaromatic ring.

The term "allylic" refers to a sp$^3$ carbon atom directly bonded to an olefinic carbon atom.

Polyolefin elastomers of the present disclosure may comprise a random cationomeric polyolefin copolymer comprising at least a first monomer and a second monomer, in which the first monomer is a neutral monomer and the second monomer has a side chain bearing a cationic moiety. According to more specific embodiments, the first monomer may comprise two or more neutral monomers that differ from one another and that are disposed randomly throughout the polymer backbone. In still more specific embodiments, at least one of the two or more neutral monomers comprising the first monomer may comprise a neutral variant of the second monomer, in which the neutral variant has not undergone a reaction with a nucleophilic component to form a cationic moiety. That is, according to some embodiments, the neutral variant may comprise a leaving group (e.g., a benzylic or allylic chloride or bromide) that remains unreacted with the nucleophilic component. Particular compositions comprising the random cationomeric polyolefin copolymers of the present disclosure are discussed in more detail herein below.

The cationomeric polyolefins of the present disclosure are random copolymers. Hence, any particular monomer ordering shown in the structural formulas of the present disclosure is intended to be illustrative and non-limiting. Moreover, the structural formulas herein have depicted a head-to-tail bonding between adjacent monomers, but it is to be appreciated that head-to-head bonding also falls within the scope of the present disclosure.

According to some embodiments, random cationomeric polyolefin copolymers of the present disclosure may have a structure exemplified by Formula 1,

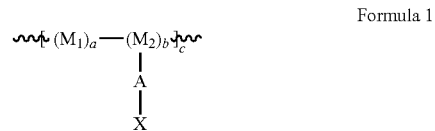

Formula 1 in which $M_1$ is a first olefinic monomer or mixture of olefinic monomers, $M_2$ is a second olefinic monomer or mixture of olefinic monomers, A is a hydrocarbyl spacer group containing a benzylic carbon atom or an allylic carbon atom, and X is a leaving group (particularly a chloride or a bromide) or a cationic moiety bonded to the benzylic or allylic carbon atom. The first olefinic monomer $M_1$ is one or more neutral olefinic monomers. Side chains are encompassed within the structure(s) associated with $M_1$. At least one of the second olefinic monomers $M_2$ in the random cationomeric polyolefin copolymer has a side chain bearing a cationic moiety, but all second olefinic monomers $M_2$ need not necessarily be functionalized with a cationic moiety. At least a portion of the first olefinic monomers defined by $M_1$ may comprise any second olefinic monomers defined by $M_2$-A which have not been functionalized with a cationic moiety. The side chain in second olefinic monomer(s) $M_2$ is defined by A-X. Variable a is an integer ranging from 0 to about 1,000, variable b is an integer ranging from 0 to about 100, and variable c is an integer ranging from about 1,000 to about 1,000,000.

In some embodiments, hydrocarbyl spacer A may be a benzylidene group or substituted benzylidene group. The benzylidene group may be a 1,2-benzylidene group, a 1,3-benzylidene group, or a 1,4-benzylidene group, according to various embodiments. In certain embodiments described in more detail herein, hydrocarbyl spacer A may be a 1,4-benzylidene.

The random cationomeric polyolefin copolymers of the present disclosure may optionally be crosslinked (vulcanized). Suitable crosslinking strategies are discussed in more detail below.

The random cationomeric polyolefin copolymers of the present disclosure may have Mw values ranging from about 100,000 to about 10,000.000, or about 200,000 to about 5,000.000, or about 250,000 to about 1,000,000. PDI values may range from 1 to about 3, or about 1.5 to about 2.5.

Up to about 15% of the total olefinic monomers in the random cationomeric polyolefin copolymers of the present disclosure may feature a cationic moiety within a side chain. In more specific embodiments, about 0.1% to about 10% of the total olefinic monomers may include a side chain cationic moiety, or about 0.5% to about 5%, or about 0.1 to about 3%, or about 1% to about 2.5%.

Some of the random cationomeric polyolefin copolymers disclosed herein may be formed by nucleophilic displacement of a leaving group. Up to about 2% of the total olefinic monomers in the random cationomeric polyolefin copolymers of the present disclosure may retain a leaving group following their exposure to a nucleophilic component to introduce one or more cationic moieties. In more specific embodiments, up to about 0.5% of the total olefinic monomers may comprise a residual leaving group, or up to about 0.1% of the total olefinic monomers may comprise a residual leaving group. In some embodiments, a non-zero amount of the total olefinic monomers may feature residual leaving groups, up to about 2% of the total olefinic monomers. In other embodiments, the olefinic monomers in the random cationomeric polyolefin copolymer may be substantially free of residual leaving groups. When calculated with respect to the olefinic monomers that originally bore a leaving group before undergoing a reaction to introduce the cationic moieties, up to about 75% of the olefinic monomers that originally bore a leaving group may retain their leaving group, with some or all of the remaining olefinic monomers originally bearing a leaving group undergoing functionalization to introduce the cationomeric moieties.

Particular counterions for the cationic moieties are not shown in the Formulas depicted herein. It is to be recognized, however, that a counterion may be associated with the cationic moieties to maintain charge balance. In more particular embodiments, the counterion to the cationic moieties may be chloride or bromide, depending upon which leaving group was displaced in the course of introducing the cationic group to the polymer side chain. It is to be further appreciated that alternative counterions for the cationic moiety may be introduced through suitable ion-exchange techniques, if desired. Exchange of the counterion may be performed, for example, to promote compatibility with a particular application.

In some embodiments, synthesis of the random cationomeric polyolefin copolymers of the present disclosure may be realized through displacement of a leaving group with an incoming nucleophile (nucleophilic component), which results in introduction of a positive charged nitrogen atom or a positively charged phosphorus atom upon at least a portion of the polymer side chains. The leaving group is present upon a benzylic carbon atom or an allylic carbon atom. Displacement of the leaving groups from the polyolefin starting material may be complete (i.e., no leaving groups remain) or partial (i.e., a mixture of $M_2$ monomers is present, some with a leaving group and some with a cationic moiety). The general synthetic scheme for production of the random cationomeric polyolefin copolymers of the present disclosure through leaving group displacement is shown in Scheme 1, Scheme 1

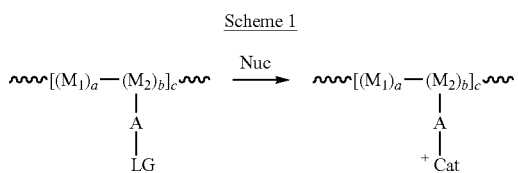

in which $M_1$, $M_2$, A, a, b and c are defined as above, LG is a leaving group, Cat is a cationic moiety, and Nuc is a nucleophilic component (nucleophile). Although Scheme 1 shows full displacement of the leaving group by the nucleophilic component, it is to be realized that partial displacement may also occur, as referenced above.

In more particular embodiments, the nucleophilic component may be a tertiary amine, a pyridine moiety, an N-substituted imidazole moiety, or a tertiary phosphine, thereby forming upon leaving group displacement, respectively, the corresponding quaternary ammonium moiety, pyridinium moiety, imidazolium moiety, or quaternary phosphonium moiety. Particular examples of suitable nucleophilic components and cationic moieties resulting therefrom are discussed in further detail below.

Accordingly, in some more specific embodiments, random cationomeric polyolefin copolymers of the present disclosure may be defined by Formula 2 below, Formula 2

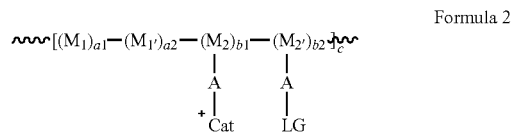

in which $M_1$ and $M_{1'}$ are first olefinic monomers that differ from one another and are neutral, variables a1 and a2 are integers ranging from 0 to about 1,000, $M_2$ and $M_{2'}$ are second olefinic monomers that differ from one another in their side chain functionalization, variables b1 and b2 are integers ranging from 0 to about 100, and variable c is an integer ranging from about 1,000 to about 1,000,000. At least one second olefinic monomer $M_2$ in the random cationomeric polyolefin copolymer has a side chain bearing a cationic moiety. A is defined as above, and may comprise a benzylic carbon atom or an allylic carbon atom in particular embodiments. In more particular embodiments, A is 4-benzylidene. LG is a leaving group, particularly chloride or bromide, bonded to a benzylic carbon atom or an allylic carbon atom in A, and Cat is a cationic moiety directly bonded to or tethered to a benzylic carbon or allylic carbon atom in A. In some or other more particular embodiments, Cat may feature a nitrogen atom or a phosphorus atom bearing a positive charge. Particular examples of cationic moieties featuring a positively charged nitrogen atom or a positively charged phosphorus atom may include quaternary ammonium moieties, quaternary phosphonium moieties, imidazolium moieties, pyridinium moieties, and any combination thereof.

In some embodiments, leaving group displacement from the polyolefin side chains may be complete or substantially complete, such that variable b2 has a value of 0 or substantially 0. Thus, in such embodiments, olefinic monomer $M_{2'}$ is not present in the polymer backbone and the random cationomeric polyolefin copolymers of the present disclosure have a structure defined by Formula 3 below.

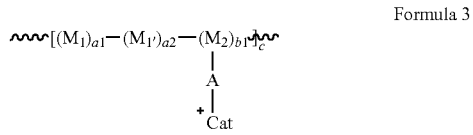

Formula 3

In some embodiments, the random cationomeric polyolefin copolymers of the present disclosure may comprise at least isobutylene as a first monomer. Particularly suitable random cationomeric polyolefin copolymers of the present disclosure may comprise isobutylene and an aryl olefin, such as styrene or p-methylstyrene, as a mixture of first monomers, or isobutylene and a diene as a mixture of first monomers, and a second monomer comprising an aryl olefin having a cationic moiety bonded to a benzylic carbon atom. Other particularly suitable random cationomeric polyolefin copolymers of the present disclosure may comprise isobutylene and isoprene as a mixture of first monomers and a second monomer comprising isoprene having a cationic moiety bonded to an allylic carbon atom thereof. Still other suitable random cationomeric polyolefin copolymers may comprise one or more of isobutylene, butadiene, or isoprene as a first monomer and a second monomer having a cationic moiety bonded to an allylic carbon atom thereof. Yet still other suitable random cationomeric polyolefin copolymers may comprise one or more of butadiene or isoprene as a first monomer and a second monomer having a cationic moiety added across a double bond thereof, wherein the cationic moiety may be tethered to a carbon atom previously forming the double bond or directly bonded to a carbon atom previously forming the double bond.

Accordingly, in some more particular embodiments, random cationomeric polyolefin copolymers of the present disclosure may have structures defined by Formulas 4-7, in which a benzylic halide or allylic halide is completely reacted with a nucleophilic component (Formulas 4 and 5) and or is incompletely reacted with a nucleophilic component (Formulas 6 and 7), Formula 4

Formula 5

Formula 6

Formula 7 in which Cat and LG are defined as above, and at least one cationic moiety is present in the random cationomeric polyolefin copolymer. $Q_k$ represents optional aromatic ring functionality selected from any combination of hydrocarbyl, halogen, perhaloalkyl, carboxylic acid, carboxylic ester, carboxamide, aldehyde, ketone, phenol, alkoxy, aryloxy, perhaloalkoxy, perhaloaryloxy, amine, nitro, nitrile, sulfonamido, and the like, wherein variable k has a maximum value of the number of open valence positions upon the aromatic ring. When variable k=0, no further aromatic ring substitution is present, and the open valence positions are occupied by H. Variables m and q are integers ranging from 0 to about 1,000. Variables n, o, p, r, s and t are integers ranging from 0 to about 100. Variable u is an integer ranging from about 1,000 to about 1,000,000. It is to be further appreciated that functionalization of the isoprene unit(s) in Formulas 5 and 7 may occur at regioisomeric positions other than those expressly depicted, given that isoprene may polymerize in a 1,2- and/or 1,4-manner. Accordingly, Formulas 8-11 (1,2-polymerization of isoprene shown) provide alternative regioisomer configurations corresponding to Formulas 5 and 7 (1,4-polymerization of isoprene shown) that also reside within the scope of the present disclosure. Moreover, any mixture of isoprene regioisomers may be present in the cationomeric polyolefins disclosed herein. Thus, the depicted structures in Formulas 5, 7 and 8-11 should be considered exemplary of the scope of the polymer structures disclosed herein. It is to be further noted that the cationic moiety and the leaving group, if still present, do not necessarily all reside at the same regioisomeric position in a given polymer chain. Moreover, when geometric isomers are possible, the double bond geometry may be cis or trans and is not limited to the depicted geometric isomer.

Formula 8

-continued

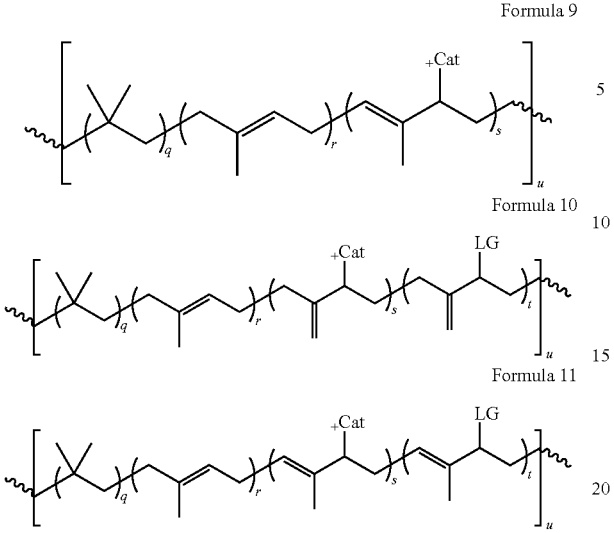

Formula 9

Formula 10

Formula 11

Residual leaving groups within the random cationomeric polyolefin copolymers disclosed herein may be used to promote vulcanization (crosslinking) in some further embodiments of the present disclosure, as discussed in additional detail below.

The foregoing random cationomeric polyolefin copolymers feature a cationic moiety that is directly bonded to a benzylic carbon atom or an allylic carbon atom that was previously functionalized with a leaving group. Other random cationomeric polyolefin copolymers of the present disclosure may feature a cationic moiety that is tethered (i.e., indirectly bonded) to a benzylic carbon atom or an allylic carbon atom by a spacer group. For example, an alkyl spacer group or an aryl spacer group may feature an amine nucleophile (e.g., a primary amine) at a first location and a cationic moiety (e.g., a quaternary ammonium moiety, a quaternary phosphonium moiety, a pyridinium moiety, or an imidazolium moiety) at a second location, wherein the amine nucleophile may promote leaving group displacement to tether the cationic moiety to the polyolefin side chain. Other nucleophiles, such as an alkoxide group or a thiolate group, for example, may be used similarly to promote tethered attachment of the cationic moiety to a benzylic carbon atom or an allylic carbon atom through nucleophilic displacement. Suitable tethers may include an optionally substituted $C_2$-$C_{10}$ alkyl group or an optionally substituted aryl group, for example.

It is also to be appreciated that cationic moieties may be introduced to random polyolefin copolymers having a benzylic carbon atom or an allylic carbon atom without a leaving group being present. In such embodiments, a sulfur radical may be utilized to introduce a tethered cationic moiety to the benzylic carbon atom or the allylic carbon atom. More specifically, under suitable conditions, a thiol compound or a disulfide compound may form a sulfur radical, which may then react with the benzylic carbon atom or the allylic carbon atom to affect bonding of the cationic moiety to the polyolefin by a sulfur-containing tether. Suitable conditions may include, for example elevated temperatures (e.g., about 40° C. to about 120° C.) in the presence of a peroxide or similar radical initiator. The sulfur atom is directly bonded to the benzylic carbon atom or the allylic carbon atom following the reaction. In particular embodiments, the sulfur-containing tether may comprise an optionally substituted $C_2$-$C_{10}$ alkylene group. Functionalization of the random polyolefin copolymer with the sulfur-containing tether may be conducted under conditions similar to those used for promoting sulfur-based vulcanization of such polyolefins, except for choosing a sulfur-containing compound to tether a cationic moiety rather than bond to a second polymer backbone. Particular examples of random cationomeric polyolefin copolymers that may be produced using sulfur radical chemistry are shown in Formulas 12 and 13 below.

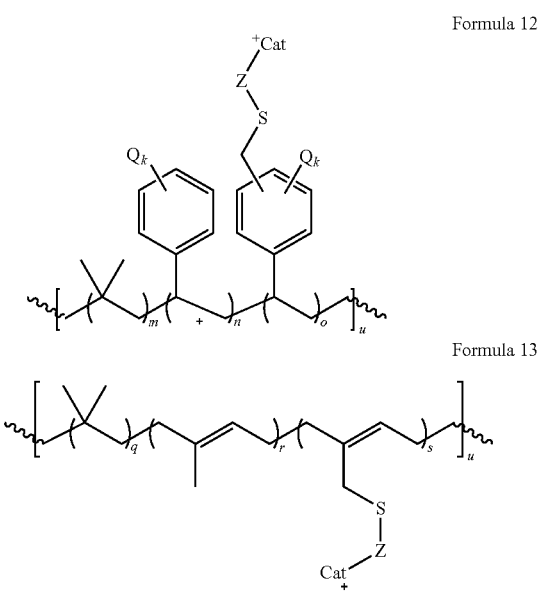

Formula 12

Formula 13 in which Z is a hydrocarbyl tether (e.g., an optionally substituted alkylene group or an optionally substituted arylene group), Q is optional aromatic ring functionality defined as above, and variables m, n, o, q, r, s and u are defined as above. In particular illustrative embodiments, Z may be an optionally substituted $C_2$-$C_{10}$ alkylene group.

In other particular embodiments associated with sulfur radical chemistry, ethylene propylene diene monomer (EPDM) polyolefins may be functionalized with a cationic moiety in accordance with certain aspects of the disclosure herein. More particularly, EPDM polyolefins may be functionalized with a tethered cationic moiety using sulfur radical chemistry according to the disclosure herein. Like the sulfur-based radical tethering discussed above, no leaving group is present in EPDM polyolefins. Thus, in certain embodiments of the present disclosure, the random cationomeric polyolefin copolymer may comprise a random terpolymer of ethylene, propylene, and a diene monomer, in which particularly suitable diene monomers may include, for example, dicyclopentadiene, 5-ethylidene-2-norbornene, or 5-vinylidene-2-norbornene. In such random cationomeric polyolefin copolymers, the cationic moiety may be indirectly bonded (tethered) to an allylic carbon atom of the diene monomer by a tether comprising a thiol moiety. The thiol moiety is directly bonded to the allylic carbon atom. Formula 14 shows a particular example of an ethylidene-2-norbornene diene monomer functionalized with a tethered cationic moiety in accordance with the disclosure above. Either geometric isomer of the double bond may be present.

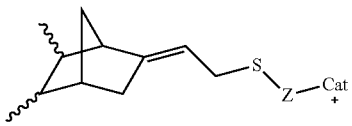

Formula 14

The wavy bonds extending from the norbornene ring are attached to other monomer units such as ethylene, propylene, unfunctionalized diene monomers, or other sulfur-functionalized diene monomers. Accordingly, it is to be appreciated that all of the diene monomers in an EPDM polymer of the present disclosure need not be functionalized with a tethered cationic moiety. As referenced above, other functionalization modalities that are also compatible with the present disclosure may include, for example, a thiol addition across a double bond of a diene monomer (e.g., by hydrothiolation) or disulfide addition across a double bond of a diene monomer.

In preceding Formulas 1-14, Cat may be a cationic moiety selected from among Formulas 15-18, and LG may be a halide selected from chloride and bromide, more particularly bromide.

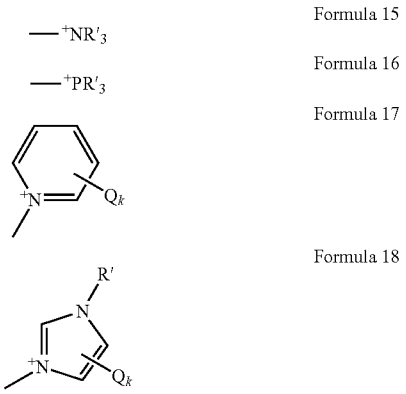

Formula 15

Formula 16

Formula 17

Formula 18

In Formulas 15, 16 and 18, R' is a $C_1$-$C_{20}$ hydrocarbyl group selected from alkyl, alkenyl, alkynyl, aryl, aralkyl, cycloalkyl, and the like, any of which may be optionally further substituted with heteroatom functionality. Each R' may be selected independently, such that they are the same or different. Two or more of R' may be optionally joined together to form a ring (e.g., an alkylene ring) in Formulas 15 and 16. In Formulas 17 and 18, $Q_k$ represents optional heteroaromatic ring functionality selected from any combination of hydrocarbyl, halogen, perhaloalkyl, carboxylic acid, carboxylic ester, carboxamide, aldehyde, ketone, phenol, alkoxy, aryloxy, perhaloalkoxy, perhaloaryloxy, amine, nitro, nitrile, sulfonamido, and the like, wherein variable k has a maximum value of the number of open valence positions upon the aromatic or heteroaromatic ring. Namely, variable k may range from 0 to 5 in the pyridinium moiety of Formula 17 and from 0 to 3 in the imidazolium moiety of Formula 18. When k is 0, Q is not present, and all of the open valence positions are occupied with hydrogen atoms in Formulas 17 and 18.

Particular examples of nucleophilic components that may be reacted to form the cationic moieties within the random cationomeric polyolefin copolymers of the present disclosure include, but are not limited to, trimethylamine, triethylamine, tributylamine, N-methylpyrrolidine. N-methylpiperidine, benzyldimethylamine, dimethylphenylamine, triphenylamine, methyl(bis-3-(dimethylphenylsilyl))amine, dimethyl(3-di methylphenylsilyl)amine, tributylphosphine, triphenylphosphine, pyridine, 2-methylpyridine, 3-methylpyridine, 4-methylpyridine, 2-t-butylpyridine, 3-t-butylpyridine, 4-t-butylpyridine, 2-chloropyridine, 3-chloropyridine, 4-chloropyridine, nicotinic acid, nicotinamide, N-methylimidazole, N-butylimidazole, N-benzylimidazole, 2-bromo-N-methylimidazole, and the like.

Accordingly, in some more specific embodiments of the present disclosure, the random cationomeric polyolefin copolymers disclosed herein may comprise a reaction product obtained from a reaction between 1) a random terpolymer of styrene, 4-vinylbenzyl bromide or 4-vinylbenzyl chloride, and isobutylene, and 2) a nucleophilic component selected from the group consisting of a tertiary amine, a tertiary phosphine, an N-substituted imidazole (e.g., an N-alkylimidazole), and a pyridine. In other more specific embodiments of the present disclosure, the random cationomeric polyolefin copolymers disclosed herein may comprise a reaction product obtained from a reaction between 1) a random copolymer of isoprene and isobutylene that is brominated or chlorinated in at least one allylic position, and 2) a nucleophilic component selected from the group consisting of a tertiary amine, a tertiary phosphine, an N-substituted imidazole (e.g., an N-alkylimidazole), and a pyridine.

In still more specific embodiments, the random cationomeric polyolefin copolymers disclosed herein may be prepared from a random terpolymer of isobutylene, p-methylstyrene, and p-bromobenzylstyrene. Such terpolymers may have weight average molecular weights ranging from about 50,000 to about 500,000, or about 100,000 to about 1,000,000, or from about 125,000 to about 400,000, or from about 150,000 to about 300,000. PDI values may range from about 1 to about 3, or from about 1.5 to about 2.5, or from about 1.75 to about 2.25. Such terpolymers may also feature a molar ratio of isobutylene:styrene:p-bromobenzylstyrene, in which the molar ratio of isobutylene ranges from about 80-95, the molar ratio of styrene ranges from about 0.5-18, and the molar ratio of p-bromobenzylstyrene ranges from about 0.4-1.4. The isobutylene and styrene ratios may be maintained in the corresponding random cationomeric polyolefin copolymer, and the molar ratio of p-bromobenzylstyrene may range from about 0-1, depending on the extent of nucleophilic displacement that has occurred.

The random cationomeric polyolefin copolymers disclosed herein may exhibit very high viscosity values at low shear rates, which results in significant green strength as well as shape persistent behavior at low to moderate temperatures. In addition, the viscosity of the resulting polymer compositions decreases significantly at elevated shear rates (i.e., the compositions are shear thinning), which is consistent with the introduction of an additional relaxation mode beyond the main chain relaxation present in the precursor polymers lacking the cationomeric moieties. This behavior and its associated dependence on the cationomeric moieties provides a means to overcome the otherwise difficult processing of non-plasticized ionomers.

The random cationomeric polyolefin copolymers disclosed herein may be thermoplastic elastomers in some embodiments. In thermoplastic elastomers of the present disclosure, there is no covalent crosslinking between adjacent polymer chains. Instead, the cationic groups associate ionically to provide a sufficiently stable network structure to promote elastomeric behavior.

In other embodiments, the random cationomeric polyolefin copolymers of the present disclosure may be thermoset elastomers. Such thermoset elastomers may be crosslinked with a suitable crosslinking agent, as discussed further herein below.

Polyolefins having an unsubstituted allylic carbon atom (e.g., polyisoprene and related polymers) may be crosslinked using crosslinking agents such as, for example, sulfur plus an organic accelerator (e.g., thiurams or thiocarbonates), phenolic resins (e.g., phenol-formaldehyde resins), bisazidoformates, quinones (e.g., quinone dioxime), and the like. Polyolefins having an allylic carbon that is halogen-substituted (e.g., halobutyl rubber and related polymers) may be crosslinked using crosslinking agents such as, for example, zinc oxide, bismaleimides, diamines, peroxides, thioureas, dithiols and disulfides, optionally employing accelerators such as thiazoles, thiocarbamates, alkoxythiocarbonyl compounds, dialkylthiophosphoryl compounds, and diamino-2,4,6-triazines. Various additives may be present when crosslinking halobutyl rubber and related polymers, such as epoxidized soybean oil, butylated hydroxytoluene, zinc stearate, zinc octanote, and/or calcium stearate. Polyolefins having a benzylic halide, particularly a benzylic bromide, may be crosslinked using crosslinking agents such as, for example, zinc stearate, zinc bromide, diamines, phenolic resins, thiosulfates, and Friedel-Crafts alkylation catalysts. Suitable crosslinking conditions and the crosslinked polyolefin structures that are produced using a particular crosslinking agent will be familiar to one having ordinary skill in the art.

In addition, the various random cationomeric polyolefin copolymers formed according to the present disclosure may also be blended with further additives to form compositions that can then be used in articles of manufacture or for an intended application. Suitable additives may include, for example, antioxidants, nucleating agents, acid scavengers, plasticizers, stabilizers, anticorrosion agents, blowing agents, gases, solvents, foaming agents, ultraviolet light absorbers, quenchers, antistatic agents, slip agents, phosphites, phenolics, pigments, dyes, fillers, fibers, cure agents, and any combination thereof.

Having described suitable random cationomeric polyolefin copolymers hereinabove, the present disclosure further provides various compositions comprising the random cationomeric polyolefin copolymers. Additional disclosure directed to the compositions and uses thereof is provided hereinafter. Any of the random cationomeric polyolefin copolymers described hereinabove may be incorporated in the various compositions of the present disclosure.

In some embodiments, the present disclosure provides foamed polyolefin compositions. The foamed polyolefin compositions comprise a gas component, and a random cationomeric polyolefin copolymer comprising at least a first monomer and a second monomer, in which the first monomer is a neutral monomer and the second monomer has a side chain bearing a cationic moiety. The gas component is disposed in a plurality of voids within the random cationomeric polyolefin copolymer. Any of the random cationomeric polyolefin copolymers described hereinabove may be incorporated as the polyolefin component in the foamed polyolefin compositions disclosed herein.

Suitable uses for the foamed polyolefin compositions may include, but are not limited to, seals and sealing applications, gaskets, shock-absorbing structures, and soundproofing foams.

Gas components suitable for use in the foamed polyolefin compositions may include any gas capable of introducing voids in a matrix of the random cationomeric polyolefin copolymer. Suitable gas components may include, for example, air, oxygen, nitrogen, carbon dioxide, noble gases, or the like. The voids introduced into the random cationomeric polyolefin copolymer may be closed cell or open cell, depending on the void density and the method employed for introducing the voids. In at least one embodiment, the random cationomeric polyolefin copolymer may be foamed by placing the random cationomeric polyolefin copolymer and the gas component under pressure and then rapidly depressurizing. The rapid depressurization may introduce voids comprising the gas component within the random cationomeric polyolefin copolymer. According to various embodiments, the porosity (void space) within a matrix defined by the random cationomeric polyolefin copolymer may range from about 50% to about 95%, or about 60% to about 90%, or about 70% to about 85%.

Higher density foamed polyolefin compositions also reside within the scope of the present disclosure, such as foamed polyolefin compositions having a porosity below about 50%, or below about 25%, or below about 10%. In particular embodiments, the porosity may range from about 1% to about 10%, or about 10% to about 30%, or about 30% to about 50%. Higher density polyolefin foams may be particularly useful in applications requiring shock absorption, for example. Shock absorption applications may include, but are not limited to, shoe soles, mattress components, components of automotive shock absorbers, and shock absorption coatings for tool and work piece handles to promote user comfort.

In some or other embodiments, the foamed polyolefin compositions disclosed herein may further comprise a surfactant, which may aid in the foaming process. Suitable surfactants may include various surface active agents, which may be cationic, anionic, amphoteric, or neutral. Surfactants that may be suitable for use in the disclosure herein will be familiar to one having ordinary skill in the art.

In some embodiments, the foamed polyolefin compositions of the present disclosure may further comprise a foaming agent. Suitable foaming agents may include, but are not limited to, azobisformamide, azobisisobutyronitrile (AIBN), diazoaminobenzene, N,N-dimethyl-N,N-dinitrosoterephthalamide, N,N-dinitrosopentamethylenetetramine, benzenesulfonyl hydrazide, benzene-1,3-disulfonyl hydrazide, 4,4'-oxybisbenzene sulfonyl hydrazide, p-toluenesulfonyl semicarbazide, barium azodicarboxylate, butylamine nitrile, nitroureas, trihydrazino triazine, peroxides, wax-encapsulated hydrocarbon blowing agents, and inorganic blowing agents such as ammonium bicarbonate and sodium bicarbonate.

In some embodiments, the foamed polyolefin compositions may be foamed neat without a solvent being present. In other embodiments, the foamed polyolefin compositions may be foamed when dissolved in a solution, such as in a hydrocarbon solvent, particularly a linear alpha olefin solvent.

Foamed polyolefin compositions lacking a solvent may further comprise various additives, such as one or more plasticizers. Suitable plasticizers will be familiar to one having ordinary skill in the art.

In other embodiments, the present disclosure provides liquid polyolefin compositions. The liquid polyolefin compositions comprise a random cationomeric polyolefin copolymer comprising at least a first monomer and a second monomer, in which the first monomer is a neutral monomer and the second monomer has a side chain bearing a cationic moiety, and a solvent in which the random cationomeric polyolefin copolymer is dissolved. Any of the random cationomeric polyolefin copolymers described hereinabove may be incorporated as the polyolefin component in the liquid polyolefin compositions disclosed herein.

In more specific embodiments, the solvent in which the random cationomeric polyolefin copolymer is dissolved is a hydrocarbon solvent. The hydrocarbon solvent may be aliphatic or aromatic in particular examples of the present disclosure. In still more specific embodiments, the hydrocarbon solvent may be an alpha olefin solvent, such as 1-hexene, 1-octene, 1-decene, or 1-dodecene, for example.

A concentration of the random cationomeric polyolefin copolymer in the solvent of the liquid polyolefin compositions may range from about 0.5% to about 10% by weight of the composition or about 1% to about 10% by weight of the composition, according to various embodiments. In some embodiments, the concentration of the random cationomeric polyolefin copolymer may be selected to provide viscosity modification of the solvent, which may entail a viscosity increase or a viscosity decrease depending on concentration and temperature, among other factors.

The liquid polyolefin compositions may be foamed or unfoamed, according to various embodiments. If foamed, the liquid polyolefin compositions may further comprise a gas component, a surfactant, and/or a foaming agent. Suitable gas components, surfactants, and foaming agents are provided hereinabove.

To facilitate a better understanding of the embodiments described herein, the following examples of various representative embodiments are given. In no way should the following examples be read to limit, or to define, the scope of the present disclosure.

This invention further relates to

1. A foamed polyolefin composition comprising:
   a random cationomeric polyolefin copolymer comprising at least a first monomer and a second monomer, the first monomer being a neutral monomer and the second monomer having a side chain bearing a cationic moiety; and
   a gas component disposed in a plurality of voids within the random cationomeric polyolefin copolymer.
2. The foamed polyolefin composition of paragraph 1, further comprising: a foaming agent.
3. The foamed polyolefin composition of paragraph 1, wherein the cationic moiety comprises at least one cationic moiety selected from the group consisting of a quaternary ammonium moiety, an imidazolium moiety, a pyridinium moiety, and a quaternary phosphonium moiety.
4. The foamed polyolefin composition of paragraph 1, wherein the first monomer comprises two or more neutral monomers that differ from one another.
5. The foamed polyolefin composition of paragraph 1, wherein the random cationomeric polyolefin copolymer comprises at least isobutylene as the first monomer.
6. The foamed polyolefin composition of paragraph 1, wherein the cationic moiety is directly bonded to a benzylic carbon atom or an allylic carbon atom in the second monomer.
7. The foamed polyolefin composition of paragraph 1, wherein the random cationomeric polyolefin copolymer comprises a reaction product obtained from a reaction between
   1) a random terpolymer of styrene, 4-vinylbenzyl bromide or 4-vinylbenzyl chloride, and isobutylene, and
   2) a nucleophilic component selected from the group consisting of a tertiary amine, an N-substituted imidazole, a pyridine, and a tertiary phosphine.
8. The foamed polyolefin composition of paragraph 1, wherein the random cationomeric polyolefin copolymer comprises a reaction product obtained from a reaction between
   1) a random copolymer of isoprene and isobutylene that is brominated or chlorinated in at least one allylic position, and
   2) a nucleophilic component selected from the group consisting of a tertiary amine, an N-substituted imidazole, a pyridine, and a tertiary phosphine.
9. The foamed polyolefin composition of paragraph 1, wherein the random cationomeric polyolefin copolymer is chemically crosslinked.
10. The foamed polyolefin composition of paragraph 1, wherein the cationic moiety is tethered to a benzylic carbon atom or an allylic carbon atom in the second monomer by a spacer group.
11. The foamed polyolefin composition of paragraph 1, wherein the random cationomeric polyolefin copolymer comprises a random terpolymer of ethylene, propylene, and a diene monomer, the diene monomer bearing the cationic moiety.
12. The foamed polyolefin composition of paragraph 11, wherein the diene monomer is selected from the group consisting of dicyclopentadiene, 5-ethylidene-2-norbornene, and 5-vinylidene-2-norbornene.
13. The foamed cationomeric polyolefin composition of paragraph 11, wherein the cationic moiety is tethered to an allylic carbon atom in the diene monomer by a spacer group comprising a thiol moiety, the thiol moiety being directly bonded to the allylic carbon atom.
14. The foamed cationomeric polyolefin composition of paragraph 11, wherein the cationic moiety is bonded to the diene monomer by hydrothiolating a double bond in the diene monomer or by adding a disulfide across a double bond in the diene monomer.
15. A liquid polyolefin composition comprising:
   a random cationomeric polyolefin copolymer comprising at least a first monomer and a second monomer, the first monomer being a neutral monomer and the second monomer having a side chain bearing a cationic moiety; and
   a solvent in which the random cationomeric polyolefin copolymer is dissolved.
16. The liquid polyolefin composition of paragraph 15, wherein the solvent comprises a hydrocarbon solvent.
17. The liquid polyolefin composition of paragraph 15, wherein the solvent comprises an alpha olefin solvent.
18. The liquid polyolefin composition of paragraph 15, wherein the cationic moiety comprises at least one cationic moiety selected from the group consisting of a quaternary ammonium moiety, an imidazolium moiety, a pyridinium moiety, and a quaternary phosphonium moiety.
19. The liquid polyolefin composition of paragraph 15, wherein the first monomer comprises two or more neutral monomers that differ from one another.
20. The liquid polyolefin composition of paragraph 15, wherein the random cationomeric polyolefin copolymer comprises at least isobutylene as the first monomer.
21. The liquid polyolefin composition of paragraph 15, wherein the cationic moiety is directly bonded to a benzylic carbon atom or an allylic carbon atom in the second monomer.
22. The liquid polyolefin composition of paragraph 15, wherein the random cationomeric polyolefin copolymer comprises a reaction product obtained from a reaction between 1) a random terpolymer of styrene, 4-vinylbenzyl bromide or 4-vinylbenzyl chloride, and isobutylene, and 2) a nucleophilic component selected from the group consisting of a tertiary amine, an N-substituted imidazole, a pyridine, and a tertiary phosphine.

23. The liquid polyolefin composition of paragraph 15, wherein the random cationomeric polyolefin copolymer comprises a reaction product obtained from a reaction between 1) a random copolymer of isoprene and isobutylene that is brominated or chlorinated in at least one allylic position, and 2) a nucleophilic component selected from the group consisting of a tertiary amine, an N-substituted imidazole, a pyridine, and a tertiary phosphine.

24. The liquid polyolefin composition of paragraph 15, wherein the random cationomeric polyolefin copolymer is a thermoplastic elastomer.

25. The liquid polyolefin composition of paragraph 15, wherein the cationic moiety is tethered to a benzylic carbon atom or an allylic carbon atom in the second monomer by a spacer group.

26. The liquid polyolefin composition of paragraph 15, wherein the random cationomeric polyolefin copolymer comprises a random terpolymer of ethylene, propylene, and a diene monomer, the diene monomer bearing the cationic moiety.

27. The liquid polyolefin composition of paragraph 26, wherein the diene monomer is selected from the group consisting of dicyclopentadiene, 5-ethylidene-2-norbornene, and 5-vinylidene-2-norbornene.

28. The liquid polyolefin composition of paragraph 26, wherein the cationic moiety is tethered to an allylic carbon atom in the diene monomer by a spacer group comprising a thiol moiety, the thiol moiety being directly bonded to the allylic carbon atom.

29. The liquid polyolefin composition of paragraph 26, wherein the cationic moiety is bonded to the diene monomer by hydrothiolating a double bond in the diene monomer or by adding a disulfide across a double bond in the diene monomer.

30. The liquid polyolefin composition of paragraph 15, wherein a concentration of the random cationomeric polyolefin copolymer in the solvent ranges from about 1% to about 10% by weight.

31. The liquid polyolefin composition of paragraph 15, wherein the liquid polyolefin composition is foamed and further comprises a gas component disposed in a plurality of voids.

32. The liquid polyolefin composition of paragraph 15, further comprising a foaming agent.

This invention also relates to:

1A. A foamed polyolefin composition comprising:

a random cationomeric polyolefin copolymer comprising at least a first monomer and a second monomer, the first monomer being a neutral monomer and the second monomer having a side chain bearing a cationic moiety; and a gas component disposed in a plurality of voids within the random cationomeric polyolefin copolymer.

2A. The foamed polyolefin composition of paragraph 1A, further comprising a foaming agent.

3A. The foamed polyolefin composition of paragraph 1A or paragraph 2A, wherein the cationic moiety comprises at least one cationic moiety selected from the group consisting of a quaternary ammonium moiety, an imidazolium moiety, a pyridinium moiety, and a quaternary phosphonium moiety.

4A. The foamed polyolefin composition of any one of paragraphs 1A-3A, wherein the first monomer comprises two or more neutral monomers that differ from one another.

5A. The foamed polyolefin composition of any one of paragraphs 1A-4A, wherein the random cationomeric polyolefin copolymer comprises at least isobutylene as the first monomer.

6A. The foamed polyolefin composition of any one of paragraphs 1A-5A, wherein the cationic moiety is directly bonded to a benzylic carbon atom or an allylic carbon atom in the second monomer.

7A. The foamed polyolefin composition of any one of paragraphs 1A-6A, wherein the random cationomeric polyolefin copolymer comprises a reaction product obtained from a reaction between 1) a random terpolymer of styrene, 4-vinylbenzyl bromide or 4-vinylbenzyl chloride, and isobutylene, and 2) a nucleophilic component selected from the group consisting of a tertiary amine, an N-substituted imidazole, a pyridine, and a tertiary phosphine.

8A. The foamed polyolefin composition of any one of paragraphs 1A-6A, wherein the random cationomeric polyolefin copolymer comprises a reaction product obtained from a reaction between 1) a random copolymer of isoprene and isobutylene that is brominated or chlorinated in at least one allylic position, and 2) a nucleophilic component selected from the group consisting of a tertiary amine, an N-substituted imidazole, a pyridine, and a tertiary phosphine.

9A. The foamed polyolefin composition of any preceding paragraph, wherein the random cationomeric polyolefin copolymer is chemically crosslinked.

10A. The foamed polyolefin composition of any one of paragraphs 1A-5A, wherein the cationic moiety is tethered to a benzylic carbon atom or an allylic carbon atom in the second monomer by a spacer group.

11A. The foamed polyolefin composition of any one of paragraphs 1A-4A, wherein the random cationomeric polyolefin copolymer comprises a random terpolymer of ethylene, propylene, and a diene monomer, the diene monomer bearing the cationic moiety.

12A. The foamed polyolefin composition of paragraph 11A, wherein the diene monomer is selected from the group consisting of dicyclopentadiene, 5-ethylidene-2-norbornene, and 5-vinylidene-2-norbornene.

13A. The foamed cationomeric polyolefin composition of paragraph 11A or paragraph 12A, wherein the cationic moiety is tethered to an allylic carbon atom in the diene monomer by a spacer group comprising a thiol moiety, the thiol moiety being directly bonded to the allylic carbon atom.

14A. The foamed cationomeric polyolefin composition of paragraph 11A or paragraph 12A, wherein the cationic moiety is bonded to the diene monomer by hydrothiolating a double bond in the diene monomer or by adding a disulfide across a double bond in the diene monomer.

15A. A liquid polyolefin composition comprising:

a random cationomeric polyolefin copolymer comprising at least a first monomer and a second monomer, the first monomer being a neutral monomer and the second monomer having a side chain bearing a cationic moiety; and a solvent in which the random cationomeric polyolefin copolymer is dissolved.

16A. The liquid polyolefin composition of paragraph 15A, wherein the solvent comprises a hydrocarbon solvent.

17A. The liquid polyolefin composition of paragraph 15A or paragraph 16A, wherein the solvent comprises an alpha olefin solvent.

18A. The liquid polyolefin composition of any one of paragraphs 15A-17A, wherein the cationic moiety comprises at least one cationic moiety selected from the group consisting of a quaternary ammonium moiety, an imidazolium moiety, a pyridinium moiety, and a quaternary phosphonium moiety.

19A. The liquid polyolefin composition of any one of paragraphs 15A-18A, wherein the first monomer comprises two or more neutral monomers that differ from one another.

20A. The liquid polyolefin composition of any one of paragraphs 15A-19A, wherein the random cationomeric polyolefin copolymer comprises at least isobutylene as the first monomer.

21A. The liquid polyolefin composition of any one of paragraphs 15A-20A, wherein the cationic moiety is directly bonded to a benzylic carbon atom or an allylic carbon atom in the second monomer.

22A. The liquid polyolefin composition of any one of paragraphs 15A-21A, wherein the random cationomeric polyolefin copolymer comprises a reaction product obtained from a reaction between
1) a random terpolymer of styrene, 4-vinylbenzyl bromide or 4-vinylbenzyl chloride, and isobutylene, and
2) a nucleophilic component selected from the group consisting of a tertiary amine, an N-substituted imidazole, a pyridine, and a tertiary phosphine.

23A. The liquid polyolefin composition of any one of paragraphs 15A-21A, wherein the random cationomeric polyolefin copolymer comprises a reaction product obtained from a reaction between
1) a random copolymer of isoprene and isobutylene that is brominated or chlorinated in at least one allylic position, and
2) a nucleophilic component selected from the group consisting of a tertiary amine, an N-substituted imidazole, a pyridine, and a tertiary phosphine.

24A. The liquid polyolefin composition of any one of paragraphs 15A-23A, wherein the random cationomeric polyolefin copolymer is a thermoplastic elastomer.

25A. The liquid polyolefin composition of any one of paragraphs 15A-20A, wherein the cationic moiety is tethered to a benzylic carbon atom or an allylic carbon atom in the second monomer by a spacer group.

26A. The liquid polyolefin composition of any one of paragraphs 15A-19A, wherein the random cationomeric polyolefin copolymer comprises a random terpolymer of ethylene, propylene, and a diene monomer, the diene monomer bearing the cationic moiety.

27A. The liquid polyolefin composition of paragraph 26A, wherein the diene monomer is selected from the group consisting of dicyclopentadiene, 5-ethylidene-2-norbornene, and 5-vinylidene-2-norbornene.

28A. The liquid polyolefin composition of paragraph 26A or paragraph 27A, wherein the cationic moiety is tethered to an allylic carbon atom in the diene monomer by a spacer group comprising a thiol moiety, the thiol moiety being directly bonded to the allylic carbon atom.

29A. The liquid polyolefin composition of paragraph 26A or paragraph 27A, wherein the cationic moiety is bonded to the diene monomer by hydrothiolating a double bond in the diene monomer or by adding a disulfide across a double bond in the diene monomer.

30A. The liquid polyolefin composition of any one of paragraphs 15A-29A, wherein a concentration of the random cationomeric polyolefin copolymer in the solvent ranges from about 0.5% to about 10% by weight.

31A. The liquid polyolefin composition of any one of paragraphs 15A-30A, wherein the liquid polyolefin composition is foamed and further comprises a gas component disposed in a plurality of voids.

32A. The liquid polyolefin composition of any one of paragraphs 15A-31A, further comprising a foaming agent.

EXAMPLES

A series of random cationomeric polyolefin copolymers were prepared by reacting a random terpolymer of isobutylene, styrene, and p-bromobenzyl styrene with the nucleophiles listed in Table 1 below. Reactions were conducted in a glove box. The random terpolymer was BIMSM (brominated copolymer of isobutylene and paramethylstyrene having a bromine content of about 1.2 mol % and a Mooney Viscosity (1+8, 125° C.) of about 45 MU (available from ExxonMobil Chemical Company, Baytown Tex. as EXXPRO™ 3745 Specialty Elastomer). To an oven-dried 2 L glass jar equipped with a magnetic stir bar was added the BIMSM (70 g, 14.8 mmol, as ~1 cm³ chunks) and tetrahydrofuran (THF) (0.8 L). The mixture was stirred at 40° C. for 20 hours. Once the polymer was completely dissolved, amine (29.6 mmol-see Table 1) was added. The reaction mixture was then stirred at 40° C. for 20 hours, at which point the reaction was complete by $^1$H NMR. The reaction mixture was poured into acetone, and the resulting mass of gum was recovered and dried under vacuum at room temperature.

TABLE 1

| Sample No. | Nucleophile | Counterion |
|---|---|---|
| Polymer 1 | 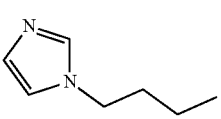 | Br |
| Polymer 2 | 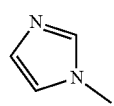 | Br |

TABLE 1-continued

| Sample No. | Nucleophile | Counterion |
|---|---|---|
| Polymer 3 | [structure: phenyl-dimethylsilyl-propyl-N(methyl)-propyl-dimethylsilyl-phenyl] | Br |
| Polymer 4 | [structure: phenyl-dimethylsilyl-propyl-N(dimethyl)] | Br |
| Polymer 5 | [structure: 3-methylpyridine] | Br |
| Polymer 6 | [structure: 4-tert-butylpyridine] | Br |

Figure 2:
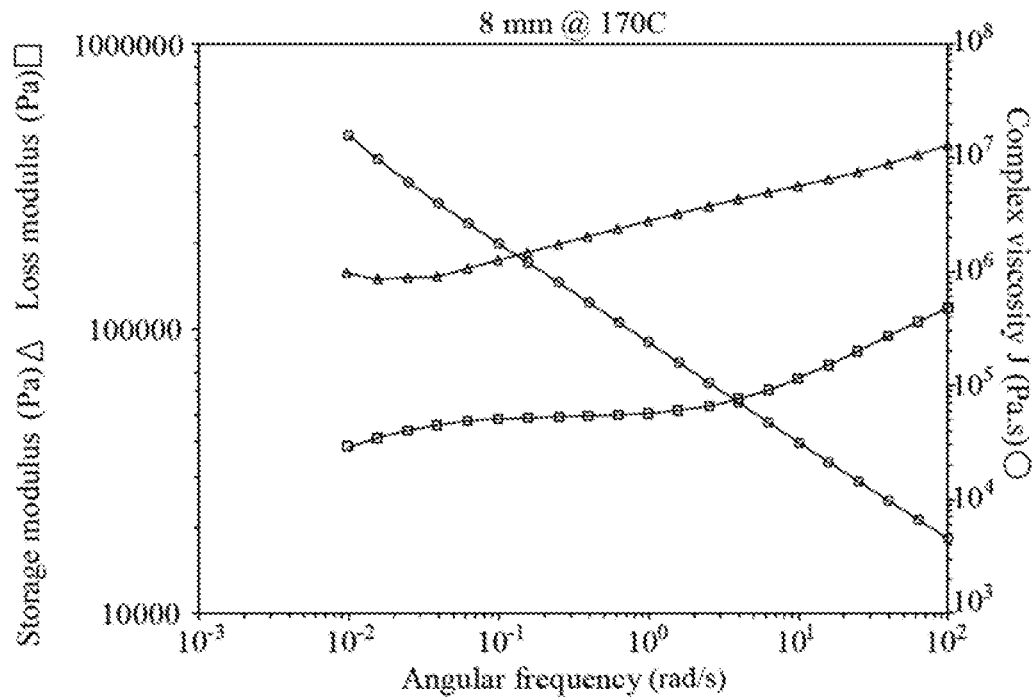
Figure 3:
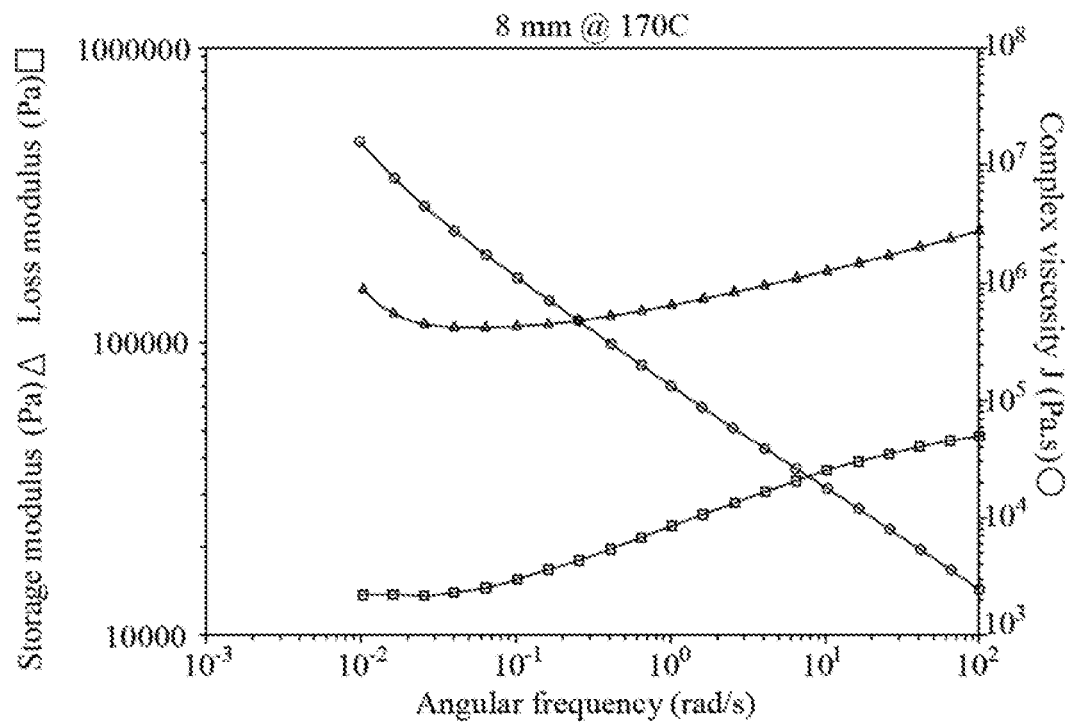
Figure 4:
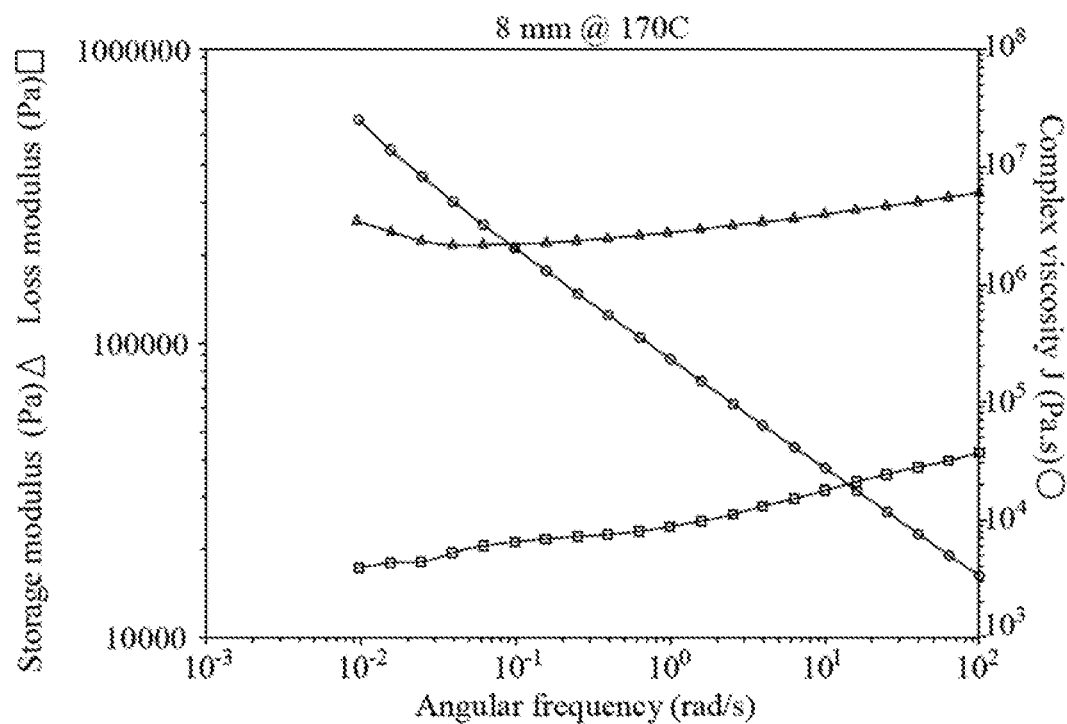
Figure 5:
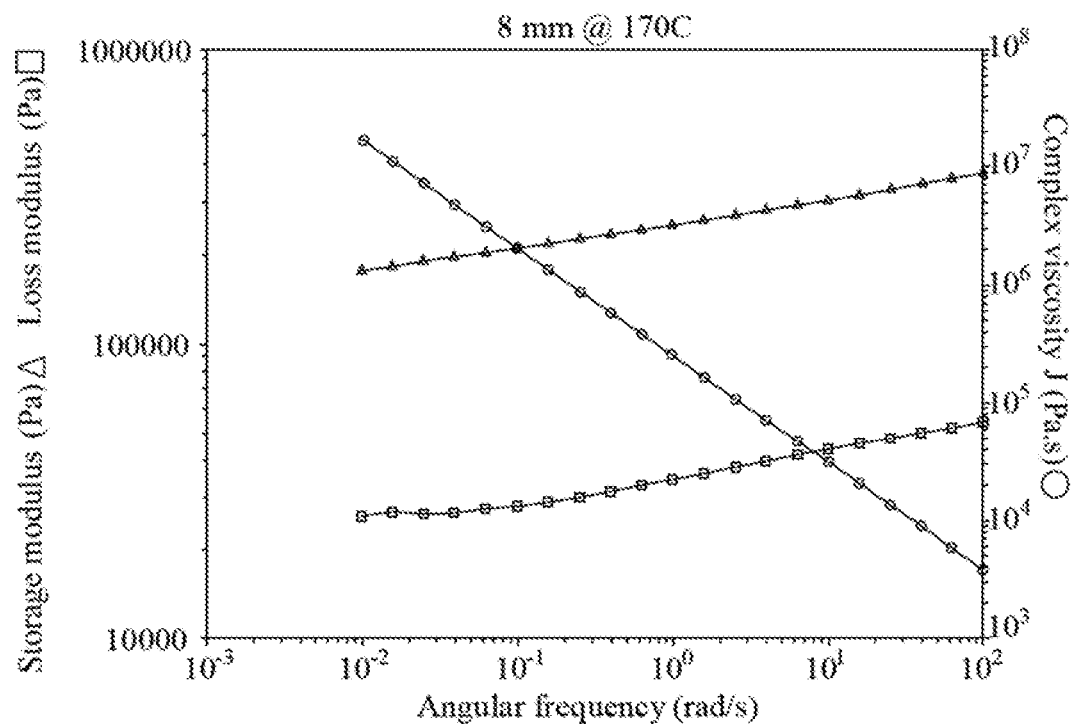
Figure 6:
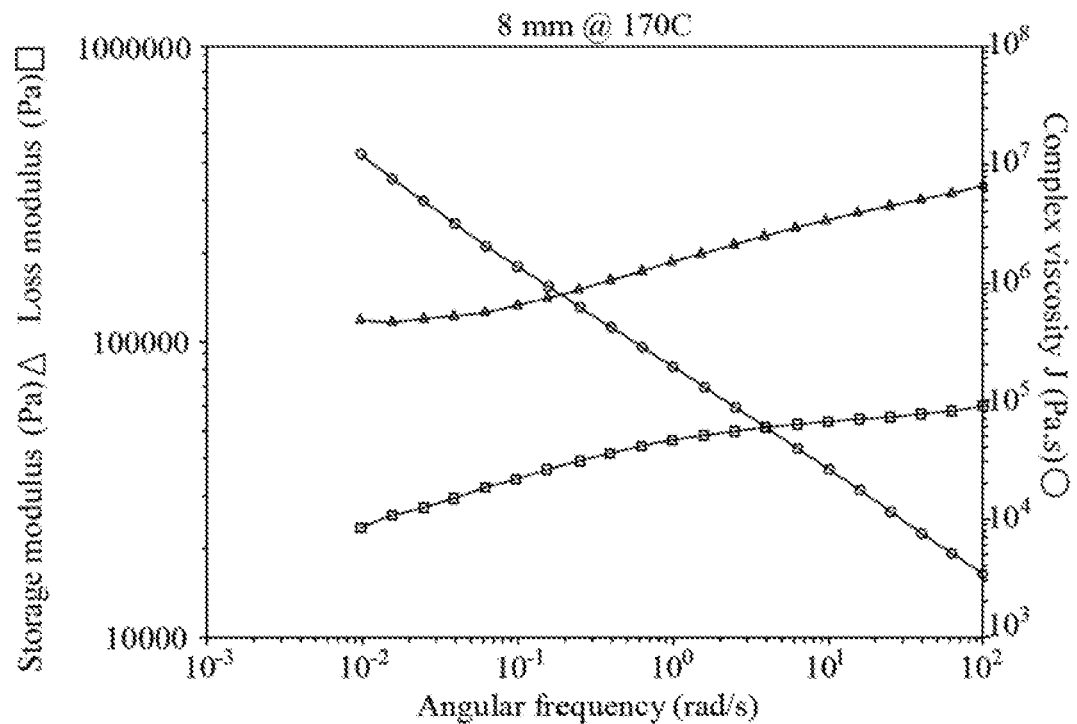

FIGS. 1-6 show graphs of illustrative rheological behavior of Polymers 1-6. Tests were completed on an ARES-G2 rheometer using an 8 mm parallel plate geometry at 170° C. and 5% strain and an angular frequency from 0.01 to 100 rad/s. Temperature sweeps were performed on the same instrument at 0.1% strain over a temperature range of −80° C. to 170° C. The random cationomeric polyolefin copolymers showed very high viscosity at low shear rates.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below.

It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

What is claimed is:

1. A foamed polyolefin composition comprising:
a random cationomeric polyolefin copolymer comprising at least a first monomer and a second monomer, the first monomer being a neutral monomer and the second monomer having a side chain bearing a cationic moiety; and
a gas component disposed in a plurality of voids within the random cationomeric polyolefin copolymer,
wherein the cationic moiety is tethered to a benzylic carbon atom or an allylic carbon atom in the second monomer by a spacer group, and
wherein the random cationomeric polyolefin copolymer comprises a reaction product obtained from a reaction between
1) a random terpolymer of styrene, 4-vinylbenzyl bromide or 4-vinylbenzyl chloride, and isobutylene, and
2) a nucleophilic component selected from the group consisting of a tertiary amine, an N-substituted imidazole, a pyridine, and a tertiary phosphine.

2. The foamed polyolefin composition of claim 1, further comprising a foaming agent.

3. The foamed polyolefin composition of claim 1, wherein the cationic moiety comprises at least one cationic moiety selected from the group consisting of a quaternary ammonium moiety, an imidazolium moiety, a pyridinium moiety, and a quaternary phosphonium moiety.

4. The foamed polyolefin composition of claim 1, wherein the random cationomeric polyolefin copolymer is chemically crosslinked.

* * * * *